United States Patent [19]

Altman

[11] Patent Number: 4,635,515
[45] Date of Patent: Jan. 13, 1987

[54] GUIDE FENCE HAVING ROLLERS TO REDUCE FRICTION

[76] Inventor: James E. Altman, P.O. Box 334, Gray, Ga. 31037

[21] Appl. No.: 738,828

[22] Filed: May 29, 1985

[51] Int. Cl.$^4$ .............................................. B27B 27/02
[52] U.S. Cl. .................................. 83/438; 144/253 R
[58] Field of Search .................. 144/253 R–253 J; 83/438, 445, 446, 467, 468, 824, 826; 269/303–306, 315–320

[56] References Cited

U.S. PATENT DOCUMENTS

| | | | |
|---|---|---|---|
| 481,983 | 9/1892 | Thom | 144/253 F |
| 647,053 | 4/1900 | Underwood . | |
| 898,259 | 9/1908 | Preston . | |
| 2,556,548 | 6/1951 | Modderman | 83/438 |
| 2,698,661 | 1/1955 | MacQuarrie | 83/492 X |
| 2,754,859 | 7/1956 | Ocenasek | 83/438 |
| 3,138,049 | 6/1964 | Flory et al. | 83/461 |
| 3,518,913 | 7/1970 | Fountain, Jr. | 83/430 X |
| 3,577,829 | 5/1971 | Hurn | 269/303 X |
| 3,786,706 | 1/1974 | Hyatt et al. | 83/122 |
| 3,865,000 | 2/1975 | Stafford | 83/430 X |
| 4,403,533 | 9/1983 | Cox et al. | 83/449 X |
| 4,521,006 | 6/1985 | Waters | 83/438 X |

FOREIGN PATENT DOCUMENTS 1277394 10/1961 France ............................ 83/449

*Primary Examiner*—James M. Meister
*Attorney, Agent, or Firm*—Hill, Van Santen, Steadman & Simpson

[57] ABSTRACT

A friction-free fence for a work table or the like which incorporates a plurality of bearing members in an upstanding work piece guidance wall thereof. The fence is particularly useful for guiding sheet material such as plaster board and the like through a self-feeding cutting device. At high cutting rates, prior art fences frictionally retard movement of the sheet material.

5 Claims, 9 Drawing Figures

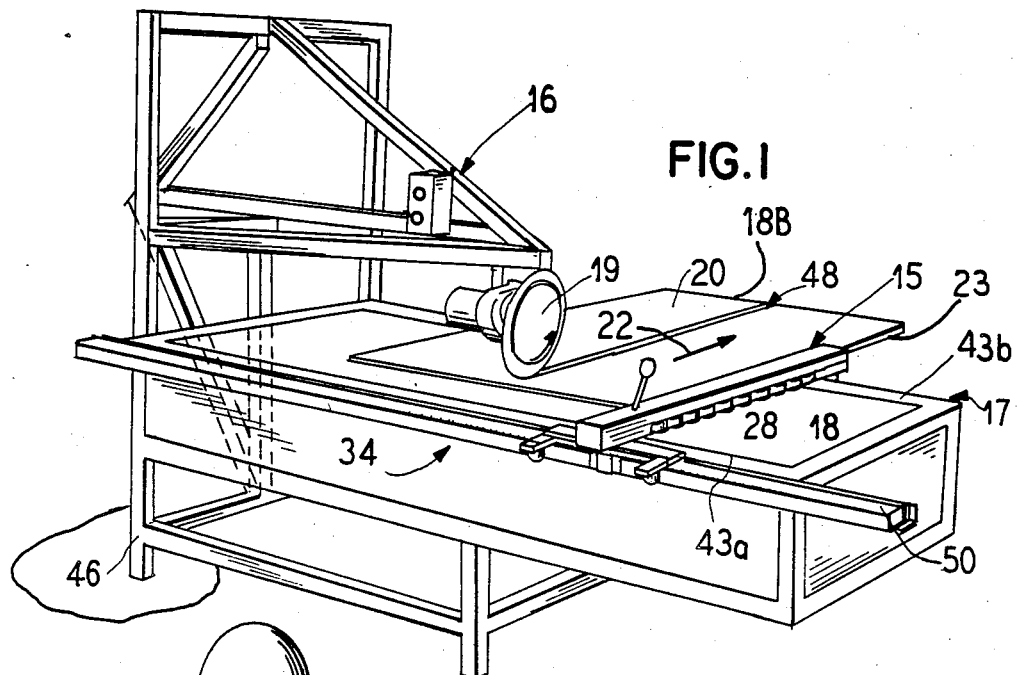
FIG. 1
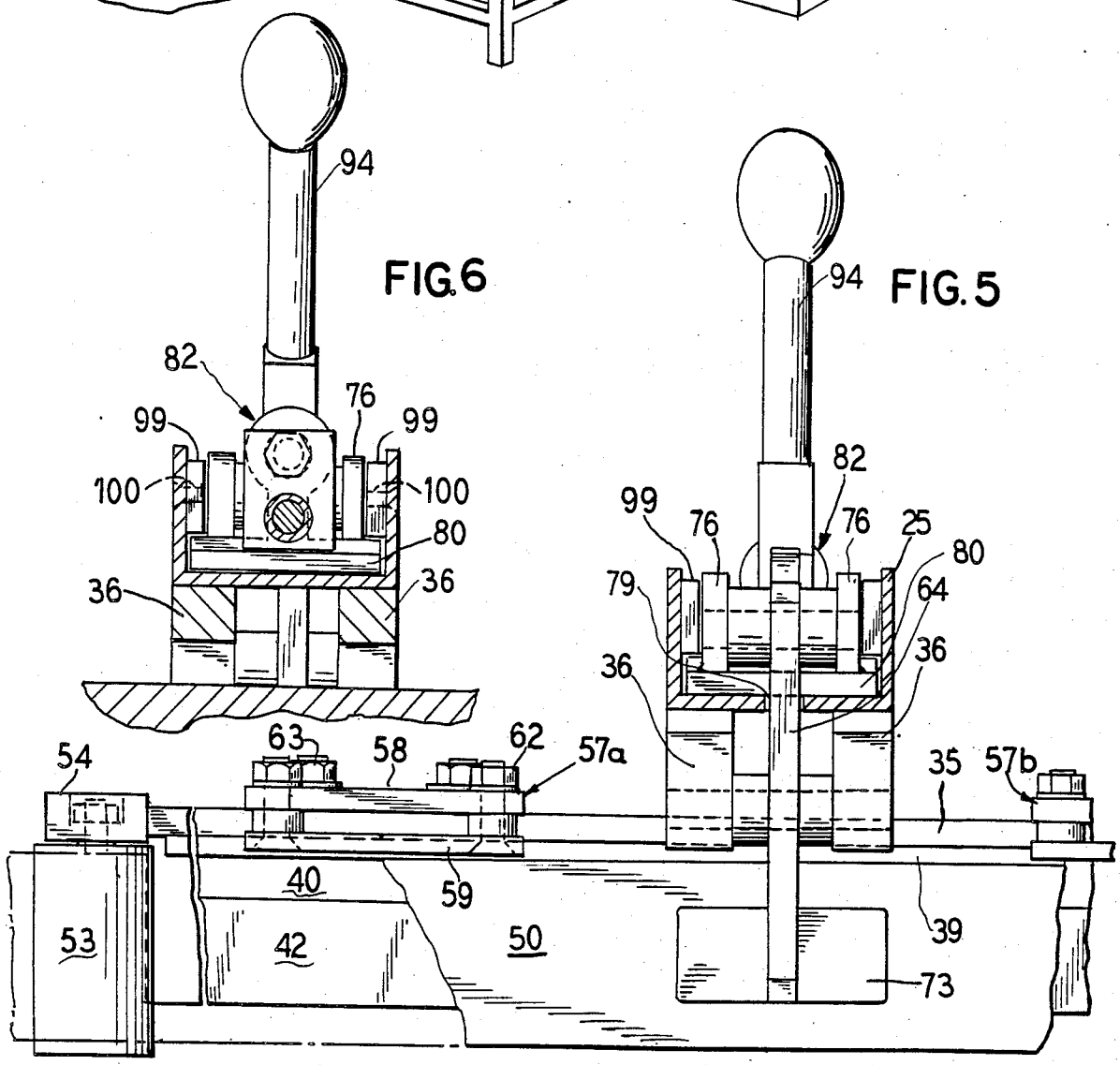
FIG. 6
FIG. 5

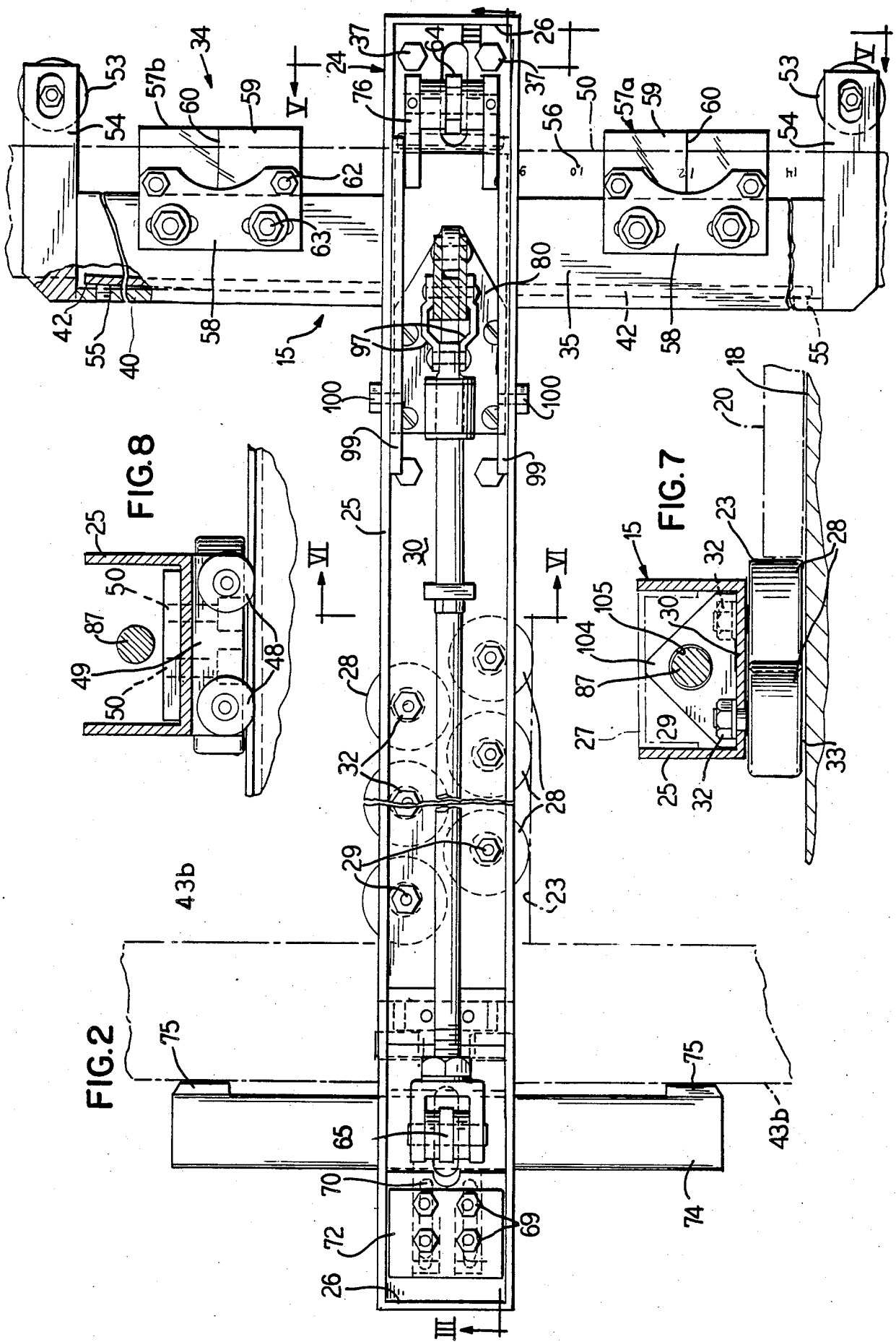

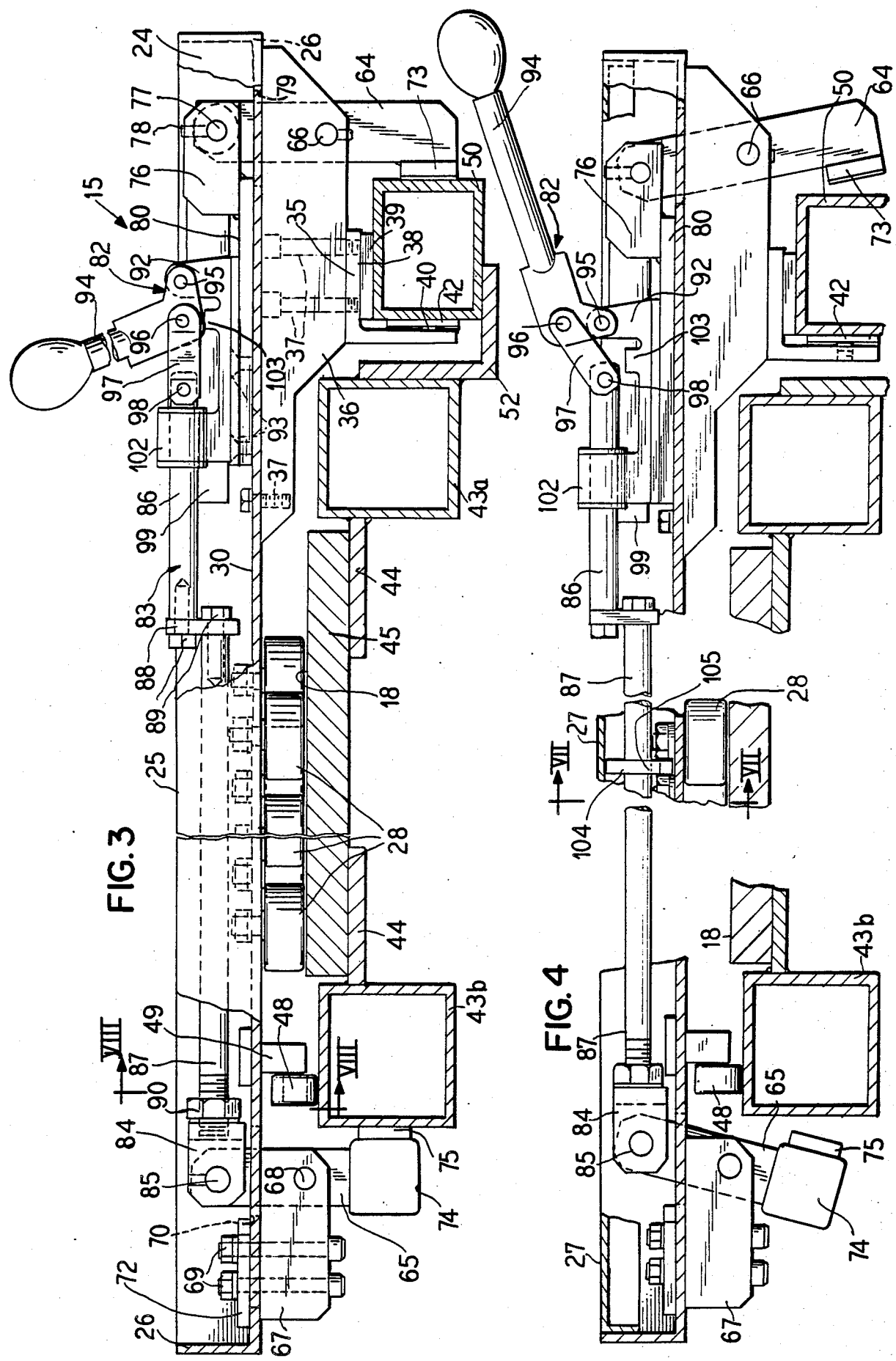

GUIDE FENCE HAVING ROLLERS TO REDUCE FRICTION

RELATED APPLICATION

This application is related to my copending U.S. patent application filed on even date herewith identified U.S. patent application Ser. No. 738,842.

BACKGROUND OF THE INVENTION

In cutting a sheet-like material, there is a need to provide edge guiding and aligning means therefore. A plate-like stop means, commonly called a fence has long been used for such purposes.

However, at high cutting rates with self-feeding cutting devices particularly for plaster board gypsum board, and the like, excessive friction develops between the edge of such a sheet material and a prior art fence that serious retardation in cutting rates can be observed.

Apparatus is therefore needed in the fence art which will reduce and preferably substantially eliminate much of the friction previously found to occur between the solid edge guiding surface of a prior art fence and the contacting edge portions of a sheet material being cut or otherwise being operated upon.

Moreover, such a friction-free fence device needs to be adjustable as regards to its location on the working surface particularly relative to a cutting device associated with such surface. At the same time, such fence device must be rigidly clampable when in a desired location on the working surface so as to permit accurate cutting to be achievable. Such adjustably clampable, friction-free fence devices, and particularly integrated combinations of such a fence device with a working table that is itself associable in a precise manner with a working surface and a cutting device of predetermined type evidently have not been heretofore available in this art. Such apparatus, if available, would have great practical value in the cutting of sheet materials, particularly large size sheet materials such as are available commercially for use in various construction applications.

BRIEF SUMMARY OF THE INVENTION

More particularly, this invention provides in one aspect an elongated fence having a guiding surface for contacting a sheet material along an edge portion thereof as such sheet material is moved slidably over a working surface. The fence guiding surface is adapted to be adjacent to and to vertically upstand from the working surface which is itself generally horizontally oriented. The fence guiding surface is elongated and adapted to extend over the working surface in one direction. Typically, such sheet material is being cut by a cutting device into and through which this sheet material is being so moved.

This fence is provided with means which substantially eliminates frictional forces from developing between the fence and the edge of the sheet material in contact therewith, particularly as the sheet material is being slidably moved over the working surface at a relatively rapid rate, such as rates in excess of about 150 feet per minute. This fence thus eliminates the prior art friction problems above referenced.

Such friction problem elimination means is provided by a plurality of revolvable roller members which are arranged in a row which are each functionally associated with the fence, and which are each adapted to rotate about an individual axis that is generally vertical to the working surface, all the axes of the row being in generally spaced, adjacent parallel relationship to one another along the fence guiding surface.

In addition, this fence is provided with clamping means for detachably securing opposed end portions of the fence to spaced, parallel fence guiding members associated with a work table which defines such working surface and which supports such cutting device. Without such clamping means, there is no way to adjust and position the fence relative to the working surface and the cutting device thereby to permit precise cuts to be made along predetermined straight lines in the sheet material.

In the presently preferred embodiment of the fence of this invention, the clamping means is so constructed that, at one end of the fence which constitutes a working station for an operator, the clamping means engages a work table guiding member adjacent thereto and the clamping means at the opposing end of the fence engaged another work table guiding member adjacent thereto as the operator pivots an operating lever that is part of the clamping means and is associated with the fence. By this means, the operator can achieve precise positioning of the fence relative to the working surface and the cutting device.

In another aspect, the present invention provides an integrated adjustable, substantially-friction free combination of fence and work table wherein the work table is provided with a station for mounting, positioning, and operating a linear cutting device whereby straight cuts can be made in sheet material which is slidably moved over the working surface of the work table with one edge of the sheet material being guided by the guiding surface of the fence, and wherein the fence is positionable and reversably clampable to opposing side edge portions of the work table. The combination is particularly well adapted for the precision cutting of large sheet material sizes (such as the standardized 4 foot by 8 foot sheets commercially available and used in construction). Also, the combination is particularly well adapted for use in combination with a linear cutting device of the self-feeding type wherein, once a cutting operation is commenced in a given sheet member, the cutting device itself as cutting progresses, draws and moves the sheet member across the working surface of the work table with one edge of the sheet material being engaged with, and guided by, the friction free guiding surface of the fence.

Such an integrated combination of adjustable substantially - friction free fence and work table, so far as is now known, has never previously existed in the art of sheet material cutting, and such combination makes possible a number of desirable results, as those skilled in the art will readily appreciate from the present description, including, for example, high speed cutting operations which are automatically carried out once each sheet material being cut is in position relative to such combination and a self-feeding cutting device, operator safety, maximum cutting accuracy, simple operations, extreme reliability and accuracy, and the like.

In another aspect, the present invention provides a new and improved process for cutting sheet material which is particularly useful at relatively high cutting speeds. The method permits one to employ a self-feeding cutting device without experiencing the heretofore observed problems of frictionally-induced movement retardation associated with the sliding contact that occurs between guiding surface portions of a fence equipped with a solid guiding surface and contacting edge portions of a sheet material being guided thereby.

Other and further objects, aims, purposes, features, advantages, embodiments, applications, variations, and the like will be apparent to those skilled in the art from the teachings of the present specification taken with the accompanying drawings.

BRIEF DESCRIPTION OF DRAWINGS

In the drawings

FIG. 1 is a perspective view of one embodiment of an edge-clamping adjustable low friction fence for sheet material and the like being used in combination with a self-feeding cutting device;

FIG. 2 is a fragmentary plan view of the fence of FIG. 1 with a top closure plate removed and with some parts thereof broken away;

FIG. 3 is a longitudinal sectional view taken along the line III—III of FIG. 2;

FIG. 4 is a view similar to FIG. 3 but showing the clamping mechanism in an open (or released) configuration;

FIG. 5 is a transverse sectional view taken along the line V—V of FIG. 2;

FIG. 6 is a transverse sectional view taken along the line VI—VI of FIG. 2;

FIG. 7 is a vertical sectional view taken along the line VII—VII of FIG. 4;

FIG. 8 is a vertical sectional view taken along the line VIII—VIII of FIG. 3.

DETAILED DESCRIPTION

Figure 9:
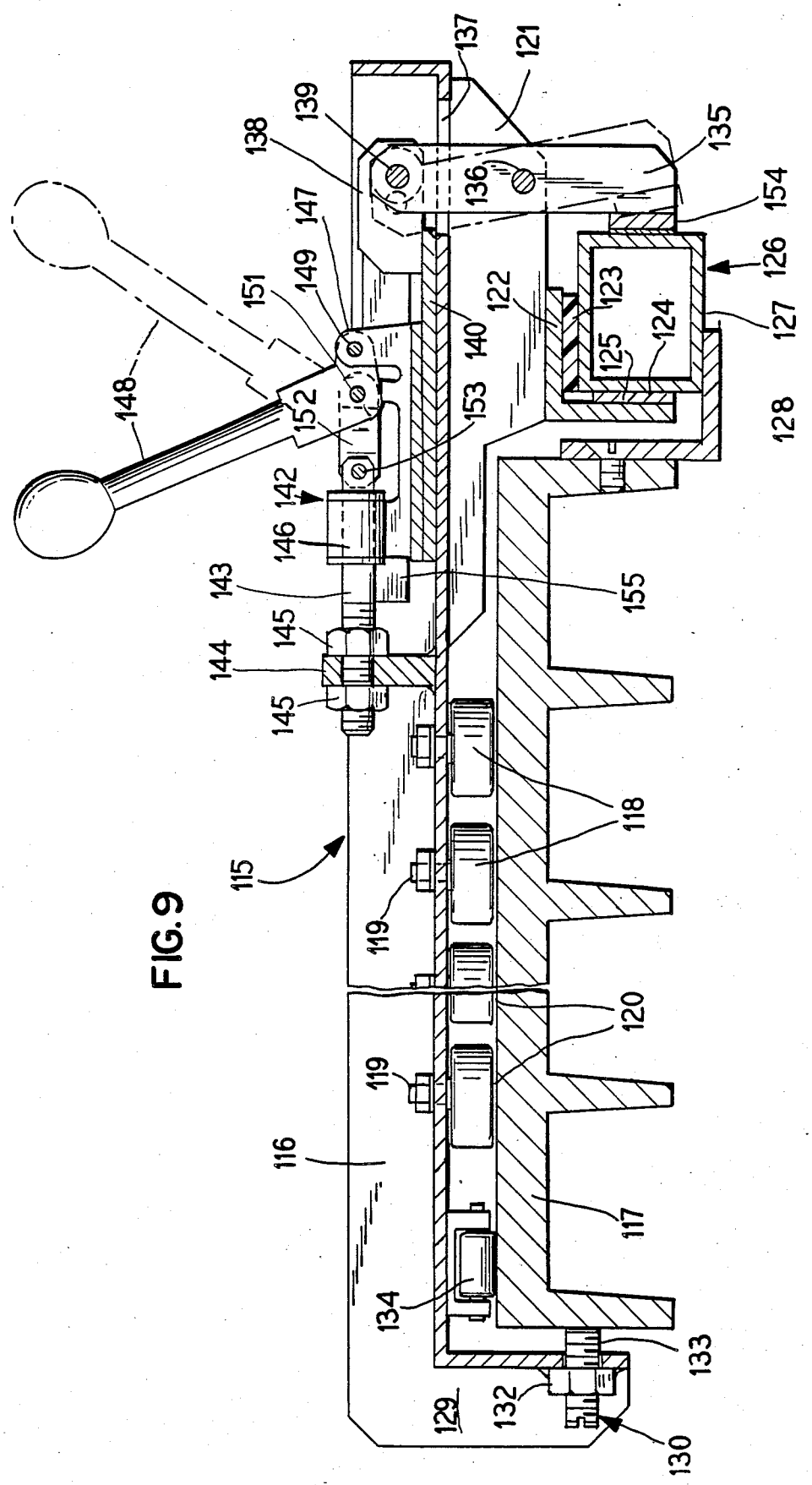
FIG. 9 is a view similar to FIG. 3 but showing an alternate embodiment of a fence structure of this invention.

Referring to the drawings, there is seen one embodiment of an adjustable end-clamping fence of the present invention which embodiment is herein designated in its entirety by the numeral 15. Fence 15 is adapted for edge guiding and aligning of sheet materials during the cutting thereof, such materials including, for examples, plaster board, gypsum board, particle board, and the like. Preferably, the fence 15 is used in combination with a self-feeding cutting device, such a device being herein designated in its entirety by the numeral 16.

The self-feeding cutting device 16 generally comprises a work table 17 which is provided with a working surface 18. Also included in the cutting device 16 is a cutting means 19 which is herein the type which advances an object being cut through the cutting means 19 once a cutting operation involving such object is initiated. The structure and operation of such a cutting means 19 is described, for example, in my co-pending application filed on even date herewith and identified above.

In operation, a work piece 20 is laid upon the preferably horizontally oriented working surface 18 and is slidably advanced over the surface 18 by horizontally exerted force exerted by an operator on work piece 20 until an edge thereof is brought into contact with a preferably vertically oriented guidance surface of fence 15. Thereafter, work piece 20 is slidably advanced by the operator over surface 18 and along this guidance surfaces of fence 15 until an edge 18B thereof is brought into contact with, or cutting engagement with, the cutting means 19 of self-advancing cutting device 16. The general direction of movement of work piece 20 into cutting means 19 is illlustrated by the arrow 22 in FIG. 1.

Since the work piece 20 is initially manually guided as it slidably moves across the working surface 18 with the edge 23 thereof while slidably engaged with a fence, frictional forces of an appreciable nature can and do characteristically develop, especially after a cutting operation by cutting means 19 is under way when a prior art fence of the type wherein the guidance surface is a solid wall, such as painted metal or the like (not shown), is employed. Such frictional forces can be sufficient to bind and impede the desired translational movement of the work piece 20 over surface 18 once cutting of work piece 20 has commenced by the cutting means 19. This friction can be so severe that the desired self feeding feature providable by the device 16 is not achievable. Self feeding or self-advancing is desired for many reasons, particularly for fast production with safety considerations, so that the hands of an operator need not be moved into dangerous proximity to the cutting means 19 during a cutting operation. In general, friction between the work piece 20 and a prior art fence impedes working speeds and severely cuts down the operational efficiency of the device 16.

In order to overcome such an undesirable frictional association between a work piece 20 and a conventional fence (not shown), the fence 15 of the present invention is provided. Referring, for instance, to FIGS. 2 and 3, it is seen that the fence 15 employs an elongated frame means 24 which is adapted to transversely extend across the working surface 18 and to project somewhat beyond opposing side edges thereof. In the present embodiment, the frame means 24 utilizes a body which is comprised of a U-shaped channel member 25 conveniently formed of metal or the like. Preferably the channel member 25 is provided with end plates 26 (paired) as well as a top plate 27 (see FIGS. 7 & 4) which cooperatively associate with the channel member 25. The end plates 27 may be welded in place, which the top plate may be bolted in place, as those skilled in the art will appreciate; alternative fastening means obviously may be employed.

The frame means 24 is provided with a plurality of roller assemblies 28. Each individual roller 28 is journaled for rotational movements upon an associated stub shaft 29. Each stub shaft 29 extends through the bottom wall 30 of the U-shaped channel member 25, each stub shaft 29 being conveniently retained in position by a nut 32 threadably engaged with the terminal projecting end portion of stub shaft 29. Conveniently, each roller 28 is formed of a molded low-friction plastic material, such as nylon, or the like.

The axis of each stub shaft 29 is oriented so as to be substantially normal to the surface 18 when the fence 15 is mounted in position over the surface 18. Preferably there is a small gap 33 between the lower edge of each roller 28 and the adjacent portion of surface 18. Each roller 28 is thus adapted to revolve freely. Since the fence 15 can be utilized and located on either side of the cutting means 19 on surface 18, each longitudinal side of the U-shaped channel member 25 is provided with a plurality of such roller assemblies 28. As is shown in the drawings, the rollers 28 are in closely spaced relationship one to another along each side of the channel member 25 and also the circumferential surfaces of each roller 28 of the plurality thereof on each side of member 25 are linearly aligned with respect to other such surfaces of adjacent rollers 28.

In order to permit the elongated frame means 24 to be moved over portions of the working surface 18, opposite end regions of the U-shaped channel member 25 are provided with means for translationally supporting opposed ends of such channel member 25 in a slightly elevated position over surface 18. Thus, for example, in the embodiment shown, the operator station end 34 of the frame means 24 is provided with a transversely extending member 35 which is here illustrated as an angle member. A pair of mounting blocks 36 is interposed between transverse member 35 and U-shaped channel member 25. The assembly of transverse member 35, block 36, and U-shaped channel member 25 are conveniently held together by a means of a plurality of machine screw 37, or the like, as desired.

The bottom surface 38 of transverse member 35 is provided with an elongated slide plate 39 which is secured to the adjoining surface of transverse member 35. The elongated slide plate 39 is conveniently comprised of a low-friction plastic material, such as a wax filled polyolefin, or the like, as those skilled in the art will readily appreciate. On the adjacent vertically extending side surface 40 of transverse member 35 a shoe 42 is mounted, likewise by machine screws (not shown) or the like. In order to provide, if desired, a uniform contacting surface of shoe 42, adjustment means, such as set screws 55 or the like may be provided if desired.

The work table 17 along its opposing side edge portions is provided with a pair of cross sectionally square tubular frame members 43a and 43b, respectively, which extend generally in spaced parallel relationship relative to one another. Each tubular member 43 is provided with a mounting strip 44, which is secured thereto by welding or the like, and a top plate 45, which defines the working surface 18, and which is mounted to the strips 44 by machine screws or the like (not detailed). Conveniently, framing means 46 is provided to support the plate 45 in a spaced parallel relationship relative to the floor. Also, the framing means 46 includes support means for the cutting means 19.

The discharge end of the frame means 24 is provided with translational supporting means consisting of a pair of rollers 48 which are each journaled for rotational movements upon a respective stub shaft (not shown) which extends in parallel relationship to bottom wall 30. Each roller 48 is mounted to a bracket 49 projecting from wall 30, the bracket 49 being mounted to wall 30 by means of bolts, or the like, as desired. The circumferential surface portions of, each roller 48 are adapted to engage the top surface of the tubular member 43b and to roll thereover longitudinally as the fence 15 is moved or translated across the surface 18. Movements of the frame means 24 are normally controlled from the region of the operator station 34, as those skilled in the art will appreciate.

A tubular guide rail 50 is provided which is supported in spaced parallel relationship to the tubular member 43a by means of a bracket 52 by welding or the like. The inter-relationship between surface portions of rail 50 and transverse member 35 is such that the slide plate 39 engages the top surface of the rail 50 while the shoe 42 engages an adjacent inner side of the rail 50. When the fence 15 moves over surface 18, the slide plate 39 moves over rail 50. The shoe 42 aides in guiding the fence 15 and in maintaining the frame means 24 thereof in a perpendicular relationship relative to the work table 17 (and tubular members 43).

A pair of guide rollers 53 is additionally provided for engaging and guiding the fence 15 in its translational movements over the surface 18. The rollers 53 are adapted to engage the forward side of the rail 50. To support the guide rollers 53, a pair of extension arms 54 is provided, each arm 54 being located at a different opposing end portion of the transversely extending member 35. The arms 54 are secured to member 35 by means of welding or the like, as desired. The rollers 53 provide a useful anticocking option for a fence 15.

In a preferred embodiment of the present invention, the shoe 42 is adapted to provide an adjustable feature near opposing ends thereof. This adjustability is achieved by means of set screws 55 which permit extending the outer surface of the shoe 42 relative to the transverse extending member 35. Thus, the U-shaped channel member 25 can be slightly regulated relative to its angular position over surface 18 by adjusting the position of the shoe 42 and the position of contact between shoe 42 and rail 50. The cutting blade employed in the cutting means 19 is typically set up so as to be substantially exactly parallel to the adjacent edge of the U-shaped channel member 25 and the circumferential surface portions of the roller assemblies 28.

Also, in a preferred embodiment, the transverse member 35 is provided with gauging means for positioning the elongated frame means 24 at an exact location upon or over working surface 18. Thus, for example, as showin in the embodiment 16, the top edge of the rail 50 is provided with a scale 56. Conveniently and preferably, the scale 56 is arranged so that mid point 0 location thereon can be in alignment with the blade of the cutting means 19 with the numbering sequence on the scale 56 increasing as one proceeds from such 0 location on either side thereof. In order to align the fence 15 relative to the scale 56, a pair of sight windows 57a and 57b is provided, one such window being located symmetrically relative to the other thereof on either side of the U-shaped channel member 25 in engagement with transverse member 35. Each sight window 57a and 57b comprises a holding bracket 58 and a transparent plate 59 formed of clear plastic or the like. A sight line 60 is formed in the transparent plate 59. The transparent plate 59 is held by bracket 58 using a nut and bolt 62 while the holding bracket 58 is secured to the transverse member 35 by nut and bolt assemblies 63. By lining up the sight line 60 of either sight window 57 with the scale 56 precise location for a fence 15 is achieved relative to surface 18.

A couple of clamping arms 64 and 65, respectively, are respectively located in adjacent relationship to each respective end of the U-shaped channel member 25. Clamping arm 64 is pivotally carried on pivot pin 66 which is carried by the mounting blocks 36, while the clamping arm 65 is carried and suspended by a pair of mounting lugs 67. The pivot pin 68 is carried by the mounting lugs 67. The mounting lugs 67 are clamped to the bottom wall 30 of the U-shaped channel member 25 by nut and bolt assemblies 69. The pivot pin 66 has a normally fixed pivotal position because of the manner in which the mounting blocks 36 are assembled. However, adjustability is provided for positioning the mounting lugs 67 and hence the position of the pivot pin 68. This adjustability feature is achieved by providing a slot 70 for each mounting lug 67. On the inside face of bottom wall 30 adjacent the slot 70, a clamping plate 72 is located. Thus before the nut and bolt assemblies 69 are tightened during assembly, each mounting lug 67 can be positioned as desired to achieve a given clamped position and to achieve a desired aligned relationship between the various components. The mounting lugs 67 (with associated components) are adjusted symmetrically so as to achieve a desired spaced relationship between pivot pin 68 and pivot pin 66 to achieve a desired clamping action. Thus, at the lower end of clamping arm 64, a clamping shoe 73 is positioned, while at the lower end of the clamping arm 65 a shoe 74 is positioned. The shoe 74 is provided with a pair of pads 75. Each pad 75 is adapted to make a flat abutting engagement with adjacent sidewall surfaces of tubular member 43b. Similarly, the clamping shoe 73 is adapted to make a similar engagement with the adjacent side of tubular guide rail 50.

A pair of mounting lugs 76 is located at the upper end of the clamping arm 64, each mounting lug 76 being interconnected with the clamping arm 64 by being journaled for pivotal movement on a pivot pin 77 which extends through the clamping arm 64. Pin 77 associates the mounting lugs 76 with clamping arm 64. Conveniently, a set screw 78 fixes the pin 77 relative to the lugs 76. The clamping arm 64 extends through a slot 79 formed in the bottom wall 30. The mounting lugs 76 are each welded to a slide plate 80 and the slide plate 80, in turn, carries a toggle linkage arrangement which is designated in its entirety by the numeral 82. Toggle linkage arrangement 82 includes a slide rod assembly 83 which extends in the shaped channel member 25. Thus, the slide rod assembly extends longitudinally between the toggle linkage arrangement 82 and a clevis 84. The clevis 84 is connected by pin 85 to the upper end of the clamping arm 65.

In the embodiment shown, the slide rod assembly 83 is comprised of a relatively short member 86 and a relatively long member 87 which are interconnected by a connector plate mean 88 and associated retaining machine screws 89. The forward end of the rod 87 is joined to the clevis 84 by a threaded end and a clamping nut 90.

The slide plate 80 carries the toggle linkage arrangement 82, and the latter includes a connecting lug 92 which is integrally associated with the slide plate 80 (the integral association being here achieved by means of machine screws 93).

After the fence 15 has been positioned over surface 18 in a desired location, the assembly has the appearance generally shown in FIG. 4. Here, knob-equipped clamping handle 94 is inclined towards the operator station 34, as shown. Thus, the handle 94 is pivotally connected at its base by a pin 95 to the connecting lug 92. A second pin 96 extending through handle 94 pivotally connects to a pair of toggle links 97. The opposite end of each toggle link 97 is connected to the adjacent end of short member 86 of the slide rod assembly 83 by means of another pin 98. The toggle linkage arrangement 82 is in its position of rest or start or unclamped orientation as shown in FIG. 4. Thus, the slide plate 80 has been moved with this action of the mounting lugs 76 to the left (in FIG. 4) which, in effect, moves the shoe 73 of clamping arm 64 out of engagement with the rail 50. Similarly, and concurrently, the shoe 74 is outwardly located in spaced relationship to the tubular member 43b. The shoe 42 is adjacent to the inner surface of the tubular guide rail 50.

As the clamping handle 94 is pivoted about pin 95, when the handle 94 is pivoted to cause the toggle linkage arrangement 82 to assume a clamped orientation, the slide plate 80 is moved to the right (in FIG. 4) which causes initial pivotal movement of the clamping arm 64 about pin 66. The clamping shoe 73 is thus moved into face to face engagement with the adjacent surface of the tubular guide rail 50. The slide plate 80 is retained in its face to face engagement with the adjacent surface of bottom wall 30 by means of hold down plates (paired) 99, each hold down plate 99 here being associated with a different sidewall portion of the U-shaped channel member 25 by means of machine screws 100, or the like. As the slide plate 80 moves to the right, and the clamping arm 64 assumes a vertical configuration as illustrated in FIG. 3, the shoe 73 engages the adjacent wall portion of the rail 50 in the configuration generally shown in FIG. 3.

As the handle 94 continues to pivot in an upward direction about the pin 95, the toggle links 97 cause the short member 86 and its associated long member 87 to move to the left (in FIG. 4) which results in a movement of the upper end of the clamping arm 65, thereby pivoting the shoe 74 so as to bring the pads 75 thereof into contact with the tubular member 43b. The final pivotal movement of the handle 94 results in continued pivotal movement of the toggle links 97 into a position where the pin 96 is brought down into an over center position relative to pin 95, thereby locking the clamping arms 64 and 65 into an engaged (clamped) configuration (FIG. 3).

A sleeve 102 is circumferentially positioned about the short member 86 in a slidable configuration. The sleeve 102 is made integral with the slide plate 80 (achieved by means of machine screw 93). The sleeve 102 provides a linear guidance for the slide rod assembly 83, as desired. In the down and locked position for the handle 94 (as shown in FIG. 3), the handle 94 comes into engagement with stop 103.

While the slide rod assembly 83 operates both in compression and in tension, in the locking operation, the slide rod assembly 83 operates in compression.

To minimize any possibility of lateral or transverse bending of the long member 87 of the slide rod assembly 83, a plurality of deflection limiting plates 104 are preferably provided, each plate 104 having the long member 87 passed there through via an apperature 105 through which the long member 87 readily clips. Each deflection limiting plate 104 is trapped in a given position within the U-shaped channel member 25 between a pair of adjacent nuts 32 and the top plate 27.

Referring to FIG. 9 there is seen another embodiment of a fence of the present invention which is herein designated in its entirety by the numeral 115 which compared to fence 15 is simplified. Like fence 15, fence 115 is adapted for edge guiding and aligning of sheet materials during the cutting thereof, and fence 15 is preferably used in combination with a self-feeding cutting device (not shown in FIG. 9 but similar to self-feeding cutting means 19). The structure and operation of fence 115 is generally similar to the operation of fence 15.

The fence 115 employs an elongated frame means 116 which is adapted to transversely extend across a working surface of a cutting table 117. The elongated frame 116 extends somewhat beyond opposing side edges of the working table 117. The frame 116 conveniently utilizes a U-shaped channel member conveniently formed of metal or the like.

The frame 116 is provided with a plurality of roller bearing assemblies 118 which are similar in structure and function to the roller bearing assemblies 28 of frame 24. The axis of the shaft 119 of each roller bearing 118 is oriented as to be substantially normal to the working surface of the table 117. Preferably there is a small gap 120 between the outside edges of each roller bearing assembly 118 and adjacent portions of the surface of table 117. Each individual roller bearing assembly 118 is in closely spaced relationship to others thereof along each side of the channel member 116 and also the circumferential services of the roller portion of each bearing assembly 118 are linearly aligned with respect to one another. Thus, the roller portion of each roller bearing assembly 118 is adapted to revolve freely. Each longitudinal side of frame means 116 is provided with a plurality of such roller bearing assemblies 118.

In order to permit the frame 116 to be translated over portions of the working surface of table 117, the opposite end regions of the frame 116 are supported. The structures employed for such purposes are similar to those employed in the fence 15 thus, at the operator end of frame 116, a pair of mounting blocks 121 are mounted in interposed relationship between a cross-sectionally L-shaped transverse angle member 122 and the frame 116. The transverse member 122 is provided with an elongated slide plate 123 on its interior horizontal surface portions which plate 123 is structured similarly to slide plate 39 on the adjacent vertically extending side surface portions 124 of transverse member 122 a shoe 125 is mounted.

The table 117 is provided with a rail attachment 126 along the side of table 117 adjacent the operator end of fence 115. The rail portion 127 thereof here is defined by a cross sectionally square tubular member which is provided with a bracket 128. The bracket 128 has one end thereof secured to the bottom face rail 127 by welding or the like while the other end thereof secured by screw means or like to the edge of the table 117.

Thus, the rail attachment 126 provides a guide and a support for the operator adjacent end region of the fence 115. In addition, it provides clamping surfaces along opposed side edge portions of rail 127 for the fence 115 when fence 115 is in a clamped configuration at a fixed location relative to table 117 as will be described below.

The opposite (operator remote) end of the fence 116 is provided with a down-turned leg 129 which is provided at its terminal portion with an adjustable screw assembly 130. Thus, the screw assembly 130 includes a nut 132 that is secured to leg 129 by welding or the like and also a screw 133 that is threadably associated with the nut 132. The relative position of the forward end of screw 133 is thus adjustable relative to the adjacent side edge of the table 117 so that these members are in abutting engagement with one another when a desired clamping action is achieved between shoe 125 and rail 127 while the fence 115 is in a clamped configuration, as will now be explained.

In order to permit the operator-remote end of frame 116 to be freely moved relative to the table 117, a roller assembly 134 may be provided as an optional feature, although, in general, any localized friction-reducing means can be employed for this purpose. A roller means 134 is here preferred as a means for minimizing frictional contact between the table 117 and adjacent portions of the fence 115, especially when 115 utilizes long spans for its frame 116.

The clamping arrangement employed in the fence 115 is somewhat similar to that employed in the fence 15. Thus, a clamping arm 135 is located in adjacent relationship to the operator end of the frame 116. The clamping arm 135 is pivotally carried on a pivot pin 136 which extends through the mounting blocks 121 transversely. Thus, the clamping arm 135 has a pivotally fixed position. A slot 137 is provided in the bottom of frame 116 through which the upper end of the clamping arm 135 projects.

A pair of mounting lugs 138 is located at the upper end of the clamping arm 135. Pin 139 associates the mounting lugs 138 with clamping arm 135. Each mounting lug 138 is interconnected with the clamping arm 135 by being journaled for pivotal movement on the pivot pin 139 which extends through the clamping arm 135. The mounting lugs 138 are each welded or otherwise fastened to a slide plate 140, and the slide plate 140, in turn, carries a toggle linkage arrangement which arrangement is here designated in its entirety by the numeral 142. The toggle linkage arrangement 142 includes a slide rod 143 which extends relative to the frame 116 longitudinally and is mounted thereto through the use of an anchor plate 144. The anchor plate 114 is rigidly secured at its bottom end portion to the frame 116 by means of welding or the like. The rod is adjustably associated with the plate 144 by nuts 145 which are threadably engaged with the terminal portion of the slide rod 143. A finite adjustment for the slide rod 143 is desirable in order to permit a desired clamping action to be achievable between the lower end of the arm 135 and the adjacent side wall portion of the rail 127 when a clamping configuration is to be assumed. Thus, the slide rod assembly extends longitudinally between the toggle linkage arrangement 142 and the anchor plate 144.

A sleeve 146 slidably engages circumferentially the slide rod 143. The sleeve 146 is mounted along an outside portion thereof, by welding or the like, to the slide plate 140. The slide plate 140 carries the toggle linkage arrangement 142, and the latter includes a connecting lug 147 which is integrally associated with the slide plate 140.

After the fence 115 has been positioned at a predetermined location over the surface of the table 117, the fence 115 has the appearance generally shown in FIG. 9 represented by the phantom lines. Thus, the knob equipped clamping handle 148 is inclined toward the operator, as shown in the unclamped mode. The handle 148 is pivotally connected at its base by a pin 149 to the connecting lug 147. A second pin 151 extends through the handle 148 and pivotally connects such to a pair of toggle links 152. The opposite end of each toggle link 152 is connected to the adjacent of slide rod 143 by means of another pin 153.

As the slide plate 140 is moved to the right in FIG. 9, a pivotal movement of the clamping arm 135 takes place about pin 136 in a manner similar to the achieved in the fence 15 with clamping arm 64. When the slide plate 140 has been moved by pivoting the handle 148 about pin 149 to the handle position shown by the solid handle lines in FIG. 9, the toggle linkage 142 in its position of clamped orientation. As the slide plate 140 moves with this action of handle 148, a shoe 154 associated with the bottom end of the clamping arm 135 moves into abutting engagement with the rail 127. When this happens, the shoe 125 is pulled into contact with the opposite side of the rail 127 to produce a positive clamping action between opposite side faces of the rail 127.

Concurrently, the forward end of screw 133 is brought into positive engagement with the adjacent side wall portion of the table 117 at the opposite or remote end of the frame 116.

The slide plate 140 is retained in its desired face to face engagement with the adjacent surface portions of frame 116 by means of hold down plates (paired) 155. The final pivotal movement of the handle 148 results in bringing the toggle links 152 into a position where the pin 151 is brought down into an overcenter position relative to the pin 149, thereby locking the clamping arm 135 into an engaged (clamped) configuration.

Since it employs only a single clamping arm 135, the fence 115 is particularly well suited for lighter duty and narrow table applications in comparison to the fence 15, as those skilled in the art will readily appreciate.

As is apparent from the foregoing specification, the invention is susceptible of being embodied with various alterations and modifications which may differ particularly from those that have been described in the preceding specification and description. It should be understood that I wish to embody within the scope of the patent warranted hereon all such modifications as reasonably and properly come within the scope of my contribution to the art.

I claim:

1. An adjustable low friction fence for positioning on a planar working table means for guiding sheet material, said table means having opposing side edge regions, said fence comprising in combination:
   (A) an elongated frame means adapted to extend transversely across said table means, said frame means having opposite end portions,
   (B) a plurality of roller means extending along at least one side of such frame means, each individual said roller means being
      (1) revolvable about an axis generally normal to said table means,
      (2) located in adjacent spaced relationship to said table means,
      (3) located in adjacent spaced relationship to adjacent ones of said roller means, and
      (4) linearly aligned with all other said roller means of said plurality,
   (C) adjustable clamping arm means functionally associated with each of said opposite end portions and said clamping arm means including shoe means to reversably engage selected portions of said opposing side edge regions,
   (D) interconnection means extending between said clamping arm means including actuation means therefor for adjustably engaging and disengaging said clamping arm means with said opposing side edge portions and further including locking means for holding said clamping arm means in a predetermined clamping configuration,
   (E) support means functionally associated with each said opposite end portion for guiding and supporting said frame means over predetermined regions along said opposing side edge portions with which said support means is adapted to make contacting engagement, whereby said fence can be translated on said support means across said working table means,
   (F) one of said opposite end portions being adapted to hold and position said actuation means for operator utilization,
   (G) guide track means for said support means located along one side of said working table means,
   (H) said support means further including slide means for riding said guide track means, and
   (I) said clamping arm means further including means for grasping opposing side portions of said guide track means when said clamping arm means is in a locked configuration.

2. The fence of claim 1 wherein said interconnection means further includes slide plate means which first engages said clamping arm means adjacent said one side with said one side before said clamping arm means is engaged with the opposing end portion of said frame means.

3. The fence of claim 2 wherein said slide plate means locks said clamping arm means to said guide track means first and thereafter locks said clamping arm means to said opposing end portion.

4. The fence of claim 1 wherein said guide track means includes a vertically oriented outside face for limiting movement of the adjacent said support means and for locking engagement with said clamping arm means.

5. The fence of claim 1 further including gauging means for positioning said fence at a predetermined location relative to said working table means.

* * * * *